US010809005B2

(12) United States Patent
Henderson et al.

(10) Patent No.: US 10,809,005 B2
(45) Date of Patent: Oct. 20, 2020

(54) ADVANCED MATERIAL FOR MOLTEN METAL PROCESSING EQUIPMENT

(71) Applicant: PYROTEK, INC., Spokane, WA (US)

(72) Inventors: Richard S. Henderson, Solon, OH (US); Jason Tetkoskie, Cleveland Heights, OH (US); Lennard Lutes, Copley, OH (US); Jon Tipton, Aurora, OH (US)

(73) Assignee: Pyrotek, Inc., Spokane, WA (US)

( * ) Notice: Subject to any disclaimer, the term of this patent is extended or adjusted under 35 U.S.C. 154(b) by 25 days.

(21) Appl. No.: 15/503,817

(22) PCT Filed: Aug. 13, 2015

(86) PCT No.: PCT/US2015/044987
§ 371 (c)(1),
(2) Date: Feb. 14, 2017

(87) PCT Pub. No.: WO2016/025676
PCT Pub. Date: Feb. 18, 2016

(65) Prior Publication Data
US 2017/0241713 A1    Aug. 24, 2017

Related U.S. Application Data

(60) Provisional application No. 62/037,387, filed on Aug. 14, 2014.

(51) Int. Cl.
F27D 27/00    (2010.01)
F04D 7/06    (2006.01)
(Continued)

(52) U.S. Cl.
CPC ......... F27D 27/005 (2013.01); B22D 1/005 (2013.01); B22D 39/00 (2013.01); C04B 35/64 (2013.01); C04B 35/83 (2013.01); C22B 21/0084 (2013.01); F04D 7/065 (2013.01); F04D 29/026 (2013.01); F04D 29/043 (2013.01); F27B 14/08 (2013.01); F27B 14/20 (2013.01); F27D 27/00 (2013.01); C04B 2235/422 (2013.01); C04B 2235/425 (2013.01);
(Continued)

(58) Field of Classification Search
CPC .............................. F27D 27/005; F04D 7/065
See application file for complete search history.

(56) References Cited

U.S. PATENT DOCUMENTS 4,490,828 A    12/1984    Fukuhara et al.
6,887,425 B2    5/2005    Mordue et al.
(Continued)

FOREIGN PATENT DOCUMENTS

EP    1028098 A2 *    8/2000    ........... C04B 35/573
JP    07-269479 A    10/1995
JP    2003-139138 A    5/2003

OTHER PUBLICATIONS

International Search Report PCT/US2015/044987.
Extended European Search Report from PCT/US2015/044987, dated Jan. 5, 2018, 7 pp.

Primary Examiner — Scott R Kastler
(74) Attorney, Agent, or Firm — Fay Sharpe LLP

(57) ABSTRACT

A molten metal processing apparatus selected from a pump, a degasser, a flux injector, and a scrap submergence device constructed to include at least one element comprised of C/C composite.

13 Claims, 9 Drawing Sheets

(51) Int. Cl.
*F04D 29/02* (2006.01)
*B22D 1/00* (2006.01)
*C22B 21/00* (2006.01)
*F27B 14/20* (2006.01)
*F27B 14/08* (2006.01)
*B22D 39/00* (2006.01)
*C04B 35/64* (2006.01)
*C04B 35/83* (2006.01)
*F04D 29/043* (2006.01)

(52) U.S. Cl.
CPC  *C04B 2235/5248* (2013.01); *C04B 2235/612* (2013.01); *C04B 2235/9676* (2013.01); *F05D 2300/224* (2013.01); *F05D 2300/6033* (2013.01); *F27D 2027/002* (2013.01)

(56) References Cited

U.S. PATENT DOCUMENTS

| | | | |
|---|---|---|---|
| 7,316,800 B1 | 1/2008 | Dardik et al. | |
| 2001/0024726 A1* | 9/2001 | Hanzawa | C04B 41/009 428/408 |
| 2004/0115079 A1 | 6/2004 | Cooper | |
| 2012/0051481 A1 | 3/2012 | Shu | |
| 2017/0241713 A1* | 8/2017 | Henderson | F27D 27/00 |

* cited by examiner

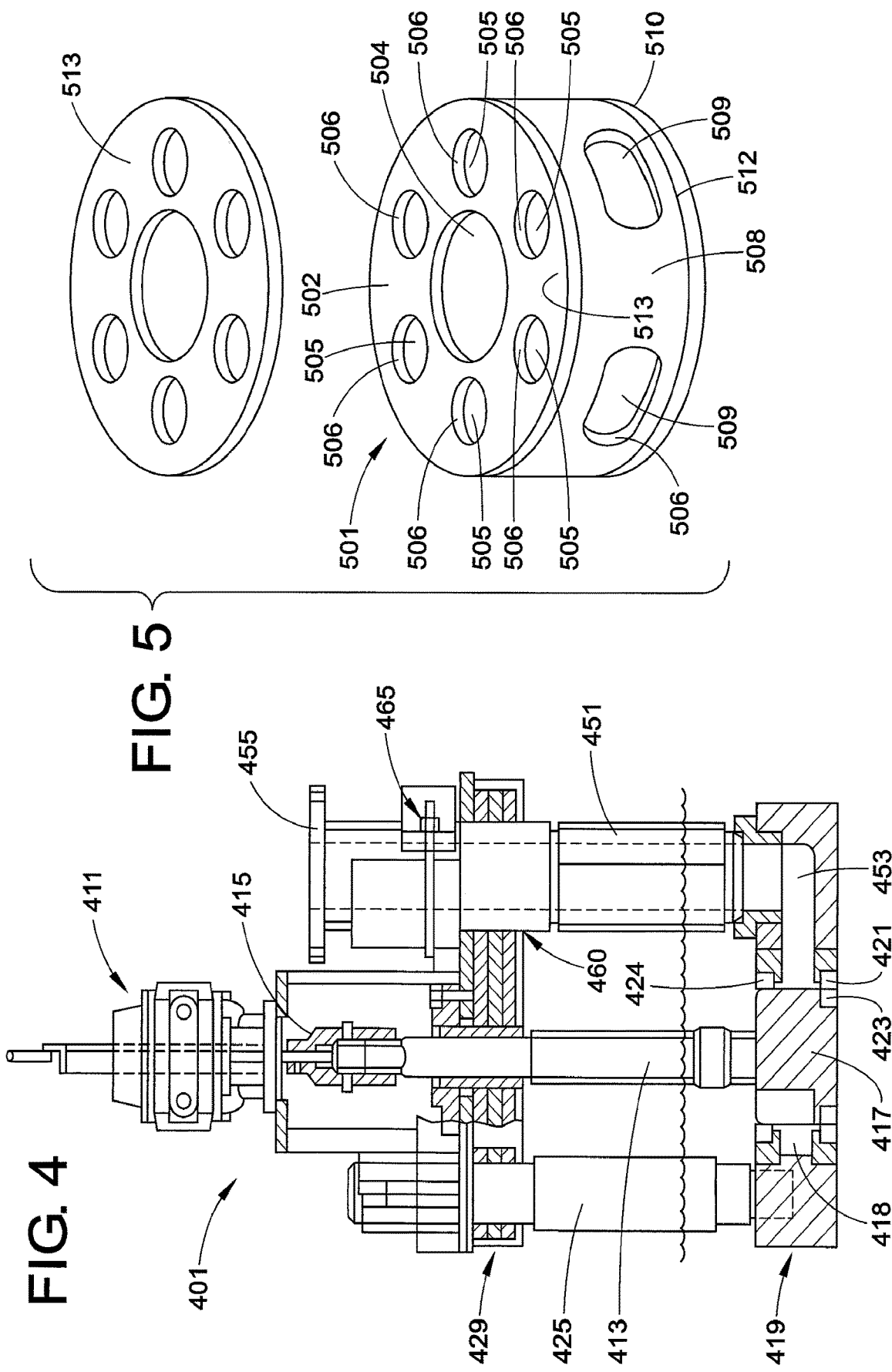

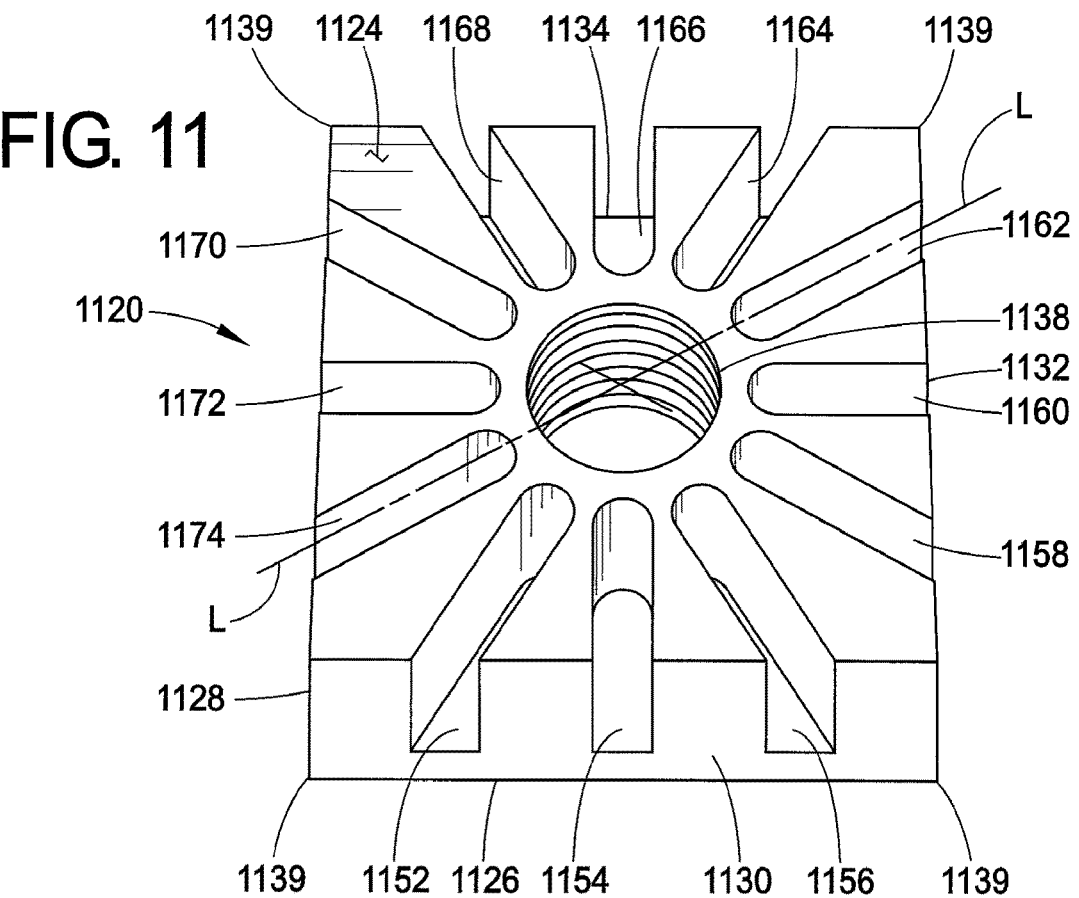
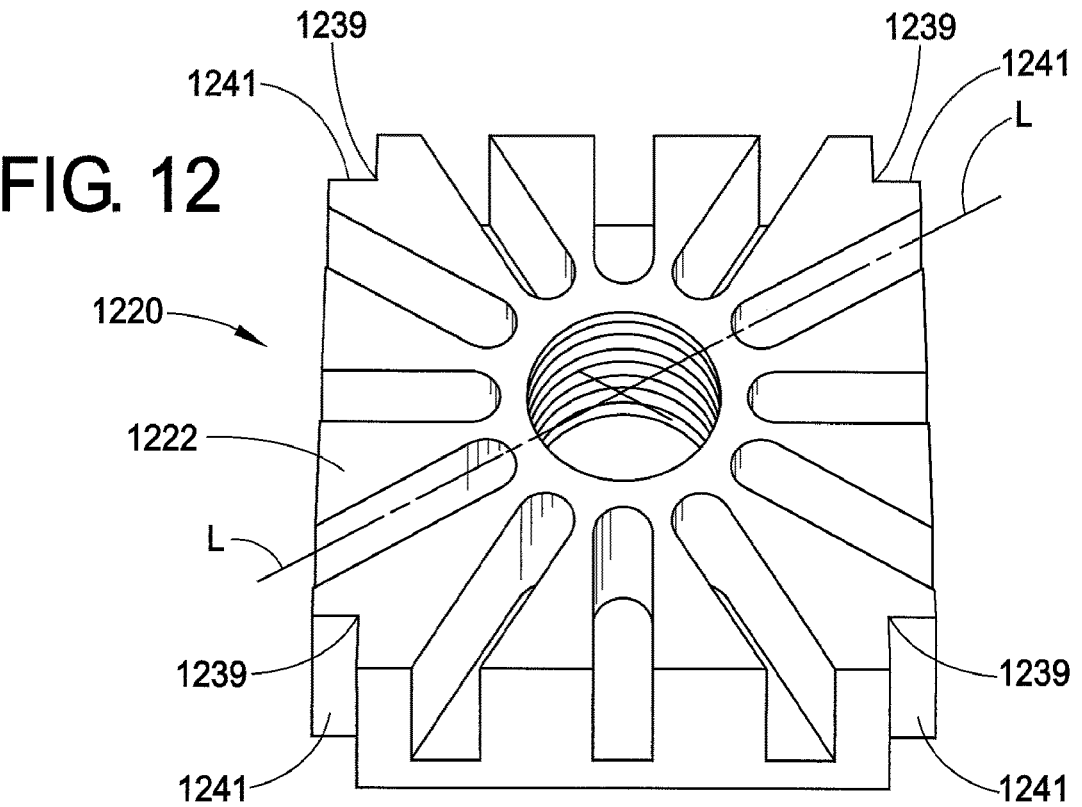

ADVANCED MATERIAL FOR MOLTEN METAL PROCESSING EQUIPMENT

This application claims the benefit of U.S. Provisional Application No. 62/037,387, filed on Aug. 14, 2014, the disclosure of which is herein incorporated by reference.

BACKGROUND

The present exemplary embodiment relates to molten metal processing. It finds particular application in conjunction with molten metal pumps, submergence devices, degassing equipment, and the like, and will be described with particular reference thereto. However, it is to be appreciated that the present exemplary embodiment is also amenable to other like applications.

Aluminum is the third most abundant element (after oxygen and silicon), and the most abundant metal, in Earth's crust. It makes up about 8% by weight of the Earth's solid surface. Aluminum is remarkable for the metal's low density and for its ability to resist corrosion due to the phenomenon of passivation. Components made from aluminum and its alloys are vital to the world's production of structural materials. Aluminum is particularly valuable because of its further advantageous ability to be readily recycled.

Aluminum is typically either melted and cast into a finished product, or cast into a billet for transport and eventual remelting and casting into the desired end product. Special handling equipment has been developed to facilitate the melting, processing, and transporting of molten aluminum.

Although the present disclosure has been associated with aluminum, it is noted that the equipment described herein may be equally suitable for use with other motel metals (and their salts), including zinc, magnesium, and nickel, as examples.

The process of molten metal handling and recycling is complex. It requires equipment for melting the metal, pumps for molten metal circulation, devices for submerging scrap metal pieces, devices for removal of impurities (e.g. filtering and degassing), devices for introduction of flux and other alloying agents, and devices for transport of the molten metal.

In a typical melting operation, a melting furnace is provided with an enclosed hearth and a connected open side well. A pump or other molten metal flow inducing apparatus is positioned in the side well and causes molten metal to circulate within the hearth. The side well may include a pump well and a melting bay which may be further divided into a charge well and a dross well. Metal may be melted by the introduction of solid bars to the main hearth and/or by the addition of metal pieces to the side well.

The charge well can be utilized to melt metal scrap. Various pieces of equipment have been developed to help submerge the scrap pieces, and are referred to herein as scrap submergence devices. The dross well can be utilized to remove contaminants. Moreover, scrap metal is usually contaminated with organic and inorganic contaminants. Organic contaminants most commonly consist of remnants of various types of oils, coatings, or paints and the like. The inorganic contaminants may include dust particles, pigments, minor amounts of various scrap metals other than the principal metal, and the like. Aluminum scrap will also normally contain varying amounts of metal oxides. The majority of the contaminants will float to the top of the bath of molten metal or form slag or slag-like skin of inorganic contaminants on the molten metal which can be skimmed off of the metal in accordance with well-established techniques.

In the processing of molten metals, for example aluminum or zinc, one commonly employed piece of equipment is a circulation pump for creating molten metal flow in a furnace. In addition, it is often necessary to pump molten metal from one vessel to another. When the molten metal needs to be removed from a vessel by elevating it over a containment wall, a so-called transfer pump is often used. These can include the traditional style of transfer pump shown, for example, in U.S. Pat. No. 5,947,705 (herein incorporated by reference) or an overflow transfer system of the type shown in U.S. Published Application US 2013/0101424 (herein incorporated by reference) or a launder/ladle transfer system of the type shown in U.S. Pat. No. 8,337,746 (herein incorporated by reference).

Most typical of this situation is where the transfer pump is placed in the charge well of a molten metal furnace to remove molten metal from the furnace, perhaps for introduction to a ladle and from there to die casters. In the aluminum recycling industry, the removal of magnesium has become a particular focus. The ability to remove magnesium from molten aluminum is made possible by a favorable chemical reaction between magnesium and chlorine. A gas injection pump can be used for this purpose.

Degassing apparatus may be used for increasing the quality of the molten metal prior to the execution of a casting operation. In such a degassing operation, a large quantity of finely bubbled inert gas such as argon gas or nitrogen gas is introduced into the molten metal, so that dissolved gas and nonmetallic inclusions are entrapped or caught by the bubbles of the inert gas, which are floated for removal. Typically, the inert gas is injected into the molten metal by means of a rotating shaft and impeller assembly disposed below the surface of the molten metal. In addition, apparatus exist for the introduction of flux, typically chlorine and/or chlorine salts, into molten metal. These apparatus can include rotating impeller/shaft combinations through which inert gas and flux can be introduced. U.S. Pat. Nos. 3,767,382 and 8,025,712 are examples of flux injectors and the disclosure of each is herein incorporated by reference.

As the skilled artisan will appreciate, the environment in which the molten metal processing equipment operates is extraordinarily harsh. For example, aluminum and magnesium melt at above 1200° F. Accordingly, not many materials function in these types of molten metals. Furthermore, the density of these liquids can provide significant mechanical stress on the equipment used to move the molten metal. In addition, the zone in which the equipment transitions from the molten metal to the surrounding atmosphere is a high temperature highly oxidative environment that renders many materials unsuitable for use. Accordingly, to date, the primary materials used to construct molten metal processing equipment, at least the elements operating below the melt line, have been graphite, silicon nitride and silicon carbide. Each of these materials suffers from shortcomings such as machinability, strength, susceptibility to thermal shock and high cost.

BRIEF DESCRIPTION

The present disclosure is directed to the concept of using an alternative material in the construction of various molten metal processing equipment components and further, representative examples of improved components that can be constructed therefrom.

According to a first embodiment, a molten metal processing apparatus selected from a pump, a degasser, a flux injector, and a scrap submergence device is provided. The apparatus is constructed to include at least one element comprised of C/C composite.

According to a further exemplary embodiment, the present disclosure is directed to an apparatus such as a molten metal pump, degasser, flux injector, and/or scrap submergence device. The apparatus can include a motor, a shaft engaging the motor at a first end and an impeller at a second end, wherein at least one component intended to be disposed below, or transition through, a molten metal surface is comprised of a C/C composite material.

According to a further embodiment, a method of processing a molten metal is provided. The method includes the steps of (i) impregnating a carbon fiber body with a resin; (ii) heating the body of step (i) to form a C/C composite; (iii) machining the C/C composite of step (ii) to form a component of a molten metal pump, degasser or scrap submergence device; and, (iv) operating a pump, degasser or scrap submergence device including the component of step (iii) in the processing of molten metal. Furthermore, it may be desirable to include an optional oxidation resistance treatment following one of steps (ii) or (iii).

BRIEF DESCRIPTION OF THE DRAWINGS

FIG. 4 is a side elevation view, partially in cross-section of a transfer pump;

FIG. 5 is an exploded view of an impeller including a C/C composite top plate;

FIG. 11 is a bottom plan view of a degassing impeller;

FIG. 12 is a bottom plan view of an impeller having a body constructed of graphite and including wear regions having C/C composite inserts;

DETAILED DESCRIPTION

Figure 1:
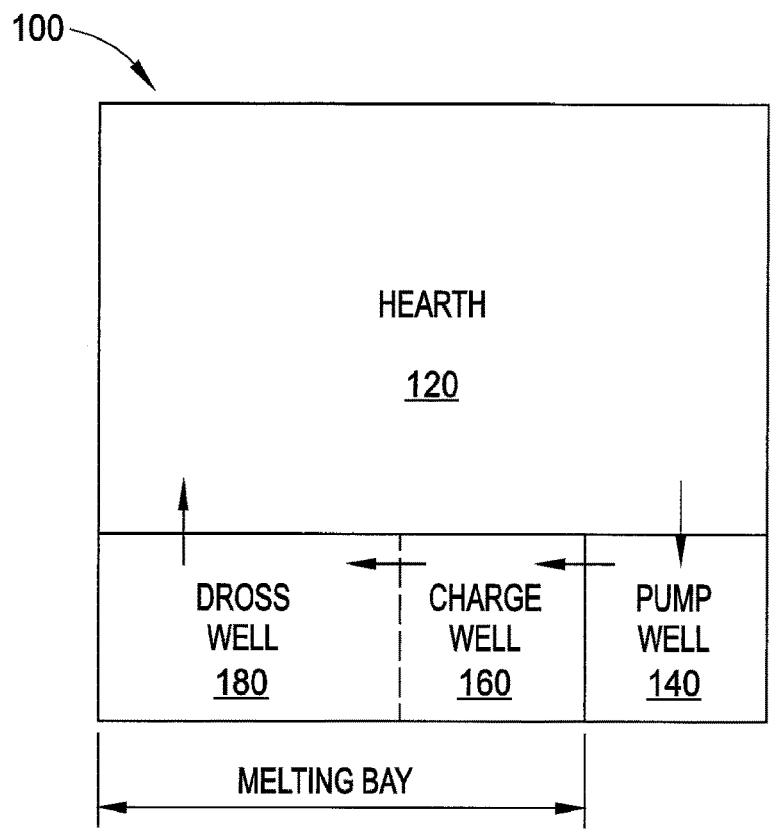
FIG. 1 is a schematic illustration of a typical molten metal furnace.

According to the present disclosure, it is contemplated that various components of molten metal processing equipment are partially or fully constructed of a carbon-carbon composite material (hereinafter C/C composite). C/C composites can be expensive to produce but provide high strength-to-weight ratio and rigidity. C/C composites can also be impregnated with an oxidation resistant chemical of the type commonly used with graphite components such as a solution including a phosphate based oxidation retardant (see U.S. Pat. No. 4,439,491, as an example, the disclosure of which is herein incorporated by reference). This is beneficial relative to, for example, high density graphite which is not easily impregnated. C/C composites offer excellent combinations of thermal conductivity and stiffness. Also, C/C composites offer low density, high stiffness, low coefficient of thermal expansion, zero to little outgassing, and a unique high temperature capability.

C/C composites have thermal stability, high resistance to thermal shock due to high thermal conductivity, and low thermal expansion behavior, i.e., low thermal expansion coefficient. These materials are also characterized as having high toughness, strength and stiffness in high temperature applications. C/C composites may comprise carbon or graphite reinforcements mixed or contacted with matrix precursors to form a "green" composite, which is then carbonized to form the C/C composite. C/C composites may also comprise carbon or graphite reinforcements in which the matrix is introduced fully or in part by chemical vapor infiltration (CVI) or chemical vapor reaction (CVR).

C/C composites may be made from fibrous materials such as carbon fibers or carbon fiber precursors. In the course of manufacturing the C/C composites, these fibrous materials are generally mixed with binders. One type of such C/C composites are made with chopped fibers mixed with pitch-based thermoplastic binder in powder form. The mixture is placed in a mold where it is compacted and heated to form a preform, and the resulting preform is carbonized by heating.

C/C composites are commercially available from such companies as Amoco, DuPont, Hercules, Celanese and others, and can take the form of fiber, chopped fiber, cloth or fabric, or chopped cloth or fabric which are referred to as molding compounds. C/C composites may also take the form of continuous filament yarn, chopped yarn, or tape made from continuous filaments and which are referred to as unidirectional arrays of fibers. Yarns may be woven in desired shapes by braiding or by multidirectional weaving. The yarn, cloth and/or tape may be wrapped or wound around a mandrel to form a variety of shapes and reinforcement orientations. The fibers may be wrapped in the dry state or they may be impregnated with the desired matrix precursor prior to wrapping, winding, or stacking to form what is commonly known as a prepreg. Such prepreg and woven structure reinforcements are commercially available from various sources including Fiberite, Hexcel and Cytec. The carbon fiber reinforcements can be prepared from precursors such as polyacrylonitrile (PAN), rayon or pitch.

Matrix precursors which may be used to form C/C composites include liquid sources such as phenolic resins and pitch, and gaseous sources, including hydrocarbons such as methane, ethane, propane, and the like. Representative phenolics include, but are not limited to, phenolics sold under the commercially available trade designations USP39 and 91LD, such as supplied by Stuart-Ironsides of Willowbrook, Ill.

The C/C composites may be fabricated by a variety of techniques. Conventionally, resin impregnated carbon fibers are autoclaved or press-molded into the desired shape on a tool or in a die. The molded parts are heat-treated in an inert environment to temperatures from approximately 1300° F. (700° C.) to 5250° F. (2900° C.) in order to convert the organic phases to carbon. The carbonized parts are then densified by carbon chemical vapor infiltration or by multiple cycle reimpregnations with resins as described above. Other fabrication methods include hot pressing and the chemical vapor infiltration of dry preforms. Methods of fabrication of C/C composites which may be used in carrying out some of the steps necessary in the fabrication method are described in U.S. Pat. Nos. 3,174,895 and 3,462,289, which are herein incorporated by reference.

Once the general shape of the C/C composite article is fabricated, the piece can be readily machined to precise tolerances, on the order of about 0.1 mm or less. Accordingly, given the strength and machinability of C/C composites, in addition to the shaping possible in the initial fabrication process, C/C composites can be formed into highly precise shapes for components by machining. In this regard, the C/C composites of the present disclosure may provide fabrication advantageous relative to ceramic which has casting precision limitations and strength advantages relative to graphite.

The C/C composites of the present description can have low friction characteristics at high temperatures by the inclusion of a controlled amount of boron, for example. C/C composites of this type may be particularly useful as a bearing ring in a molten metal pump.

An aluminum recycling furnace is described in U.S. Pat. No. 6,217,823 herein incorporated by reference. Referring now to FIG. 1, an aluminum recycling furnace 100 is depicted. Furnace 100 includes a main hearth component 120 which is heated, for example, with gas or oil burners or by any other means known in the art. Adjacent, and in fluid communication with the hearth 120, is the primary recycling area comprised of a pump well 140, a charge well 160 and a dross well 180. Although not shown, the wall of the hearth 120 opens to the pump well 140, which opens to the charge well 160, which opens to the dross well 180, which in turn opens to the hearth 120 to allow the circulation pattern shown by the arrows. The pump well receives a molten metal pump. The molten metal pump circulates molten metal from the hearth 120 to the charge well 160 where scrap chips of the metal to be processed are deposited onto the surface of the melt. Molten metal from the charge well 160 flows into the dross well 180 where impurities in the form of dross are skimmed from the surface before the melt flows back into the hearth 120.

Figure 2:
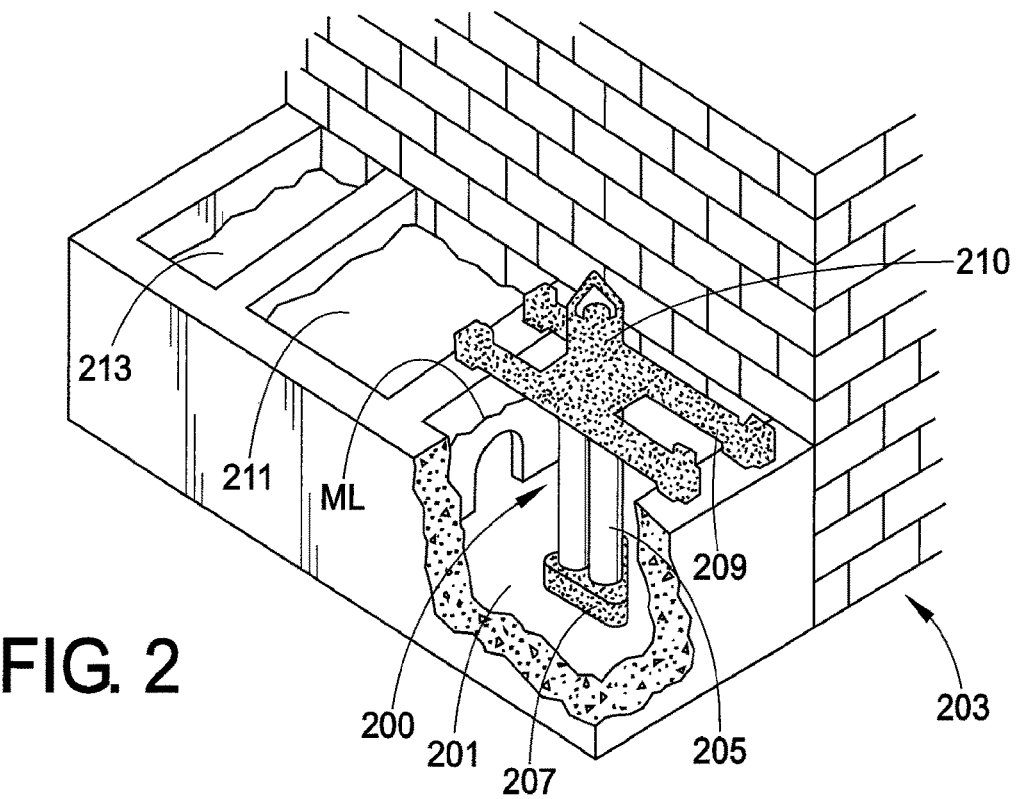
FIG. 2 is a perspective view of a molten metal furnace with partial cut-away to illustrate a molten metal pump.

Referring now to FIG. 2, a molten metal circulation pump 200 within a pump well 201 of recycling furnace 203 is shown. This type of pump is more fully described in U.S. Pat. No. 6,887,425, herein incorporated by reference. Pump 200 includes a plurality of posts 205 attached to a base 207 and suspended from a motor mount 209. An impeller (not shown) is disposed within base 207 and connected to motor 210 via a shaft and coupling (not shown). Pump 200 circulates molten metal from pump well 201 into charge well 211 and dross well 213. The pump depicted in FIG. 2, is commonly referred to as a circulation pump.

In accord with the present disclosure and more fully described within the following discussion of various molten metal pump apparatus, it is envisioned that the below melt line (ML) components of the pump may be constructed wholly or in part of C/C composite materials. Similarly, in view of excellent oxidation resistance achieved by chemical treatment, components at or near the ML may also be constructed of C/C composite materials. These components include the base housing, the shaft, the impeller, one or more bearing rings, and/or pump posts or sleeves.

Figure 3:
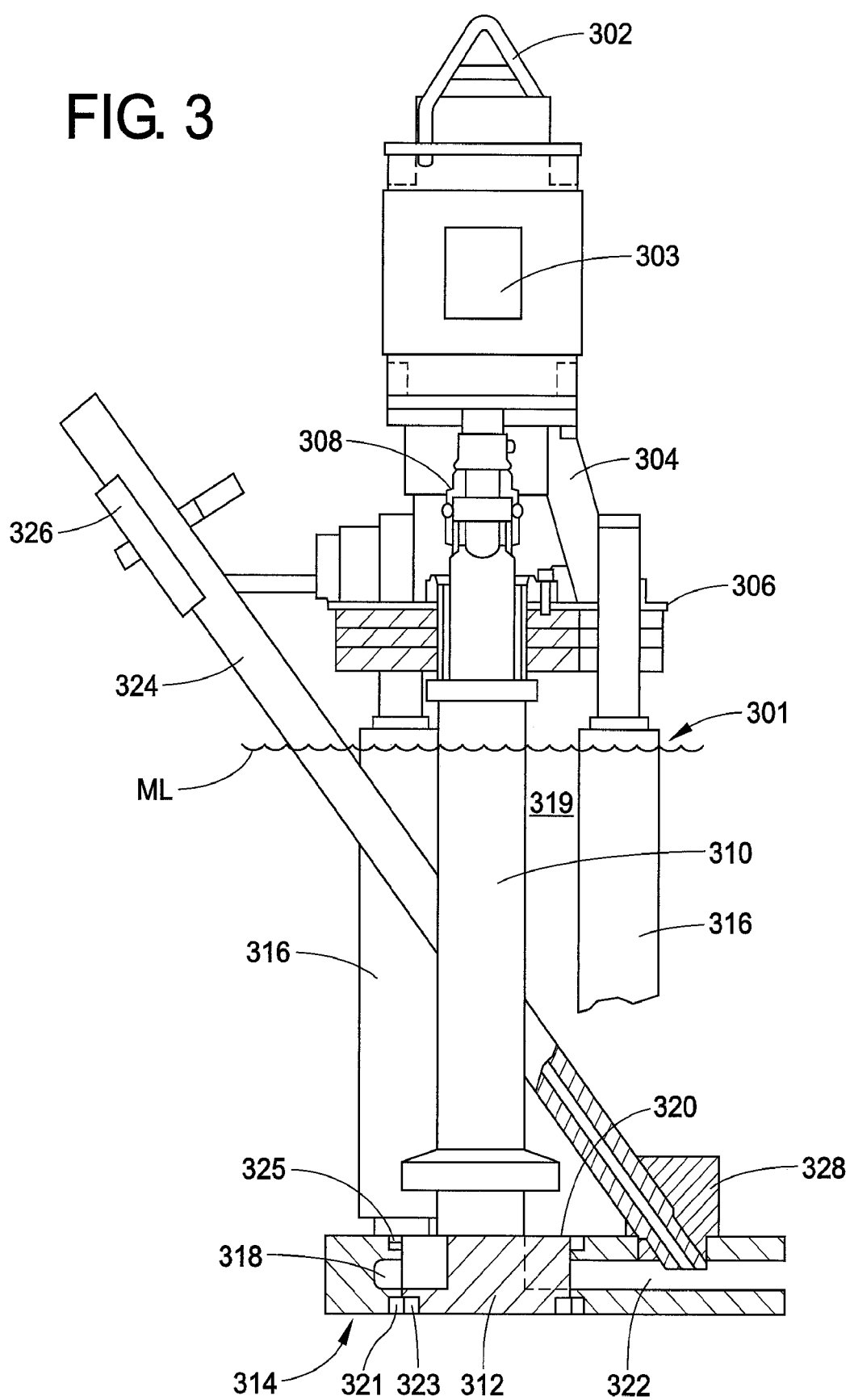
FIG. 3 is a side elevation view, partially in cross section, of a gas injection pump.

In certain molten metal processing operations, a gas injection pump of the type depicted in U.S. Pat. No. 5,993,728, herein incorporated by reference, may be employed. Moreover, in working with certain molten metals, it may be necessary to perform gas injection to remove undesired impurities. Referring now to FIG. 3, a typical gas injection pump 301 is depicted. Pump 301 includes a hanger assembly 302 used for lifting and positioning of the pump as necessary within a furnace. A motor 303 is supported by a motor mount 304, itself supported by a support plate 306. The motor 303 is connected via a coupling assembly 308 to a rotatable shaft 310 secured to an impeller 312. A base assembly 314 is attached to motor mount 304 by a plurality of posts 316. The impeller 312 is rotatable within a pumping chamber 318 and it's rotation draws molten metal 319 into the pumping chamber 318 through an inlet 320 and discharges the molten metal through an outlet passage 322. Bearing rings pairs 321 and 323 are disposed cooperatively on the impeller 312 and in the wall of pumping chamber 318. A further bearing ring 325 can be disposed in the top of pumping chamber 318 and opposed to a top radial edge of impeller 312.

A reactive gas (such as chlorine) is provided to a gas injection tube 324 supported by a clamping mechanism 326 attached to the support plate 306. The submerged end of the gas injection tube 324 is connected via a tube plug 328 to the outlet passage 322. In addition to C/C composite elements identified in FIG. 2, the gas injection tube 324 and tube plug 328 may be constructed of a C/C composite material. Accordingly, components of pump 301 that may be advantageously wholly or partially constructed from a C/C composite material include base assembly 314, impeller 312, posts 316, shaft 310, gas injection tube 324, tube plug 328, and one or more bearing rings 321, 323 and 325.

In addition to situations where molten metal is circulated by a circulation pump or circulated and treated by a gas injection pump, there are circumstances where molten metal is removed from a furnace and transferred remotely for further processing. An exemplary transfer pump is described in U.S. Pat. No. 5,947,705, herein incorporated by reference.

A typical transfer pump 401 as shown in FIG. 4 includes a motor 411 attached to a rotatable shaft 413 by a coupling assembly 415. The shaft 413 is attached at its lower end to a rotatable impeller 417 which rotates within the pumping chamber 418 within base 419. A bearing ring 421 is provided in the lower region of base 419 in a facing orientation with a bearing ring 423 disposed in a lower annular edge of the impeller 417. A further bearing ring 424 can be disposed in an upper region of base 419, facing an upper annular edge of impeller 417 to allow proper rotation of the impeller. The motor 411 is supported and connected to the base assembly 419 by a pair of posts 425 (only one of which is visible) which are attached to a motor mount platform 429.

A riser tube 451 has a first end disposed within an outlet 453 in the base 419 and is secured in a motor mount opening 460 via a coupling adaptor 465. An upper end of the riser tube 451 includes a flange 455 to which an elbow (not shown) can be attached. The elbow engages transfer piping that allows molten metal to be moved to a remote location. In addition to the pump components articulated above which are suitable for construction from C/C composite materials, the transfer pump riser assembly may be constructed therefrom.

With respect to FIG. 5, an impeller including a C/C composite component is depicted. The impeller 501 is a generally cylindrical shaped body of graphite or ceramic and includes an upper face 502 having a recess 504 to accommodate a shaft. The upper face 502 also includes inlets 505 to passages 506 which extend downwardly from the upper face and outwardly through a sidewall 508, to an outlet 509. A bearing ring 510 of a ceramic, such as silicon carbide or C/C composite material, is provided surrounding the outer edge of a lower face 512. A C/C composite disc 513, is secured to the top surface 502 of the impeller 501 to improve the wear characteristics of the device (the disk 513 is shown both removed and attached in FIG. 5).

Of course, the shape of the impeller and/or the protective top plate is not limited to a cylindrical shape. Rather, the use of a protective top or bottom plate of C/C composite material with any shape impeller, including bird cage, vaned, triangular or any polygonal shape, is contemplated. Furthermore, it is contemplated that the entire impeller body may be constructed of a C/C composite material.

Figure 6:
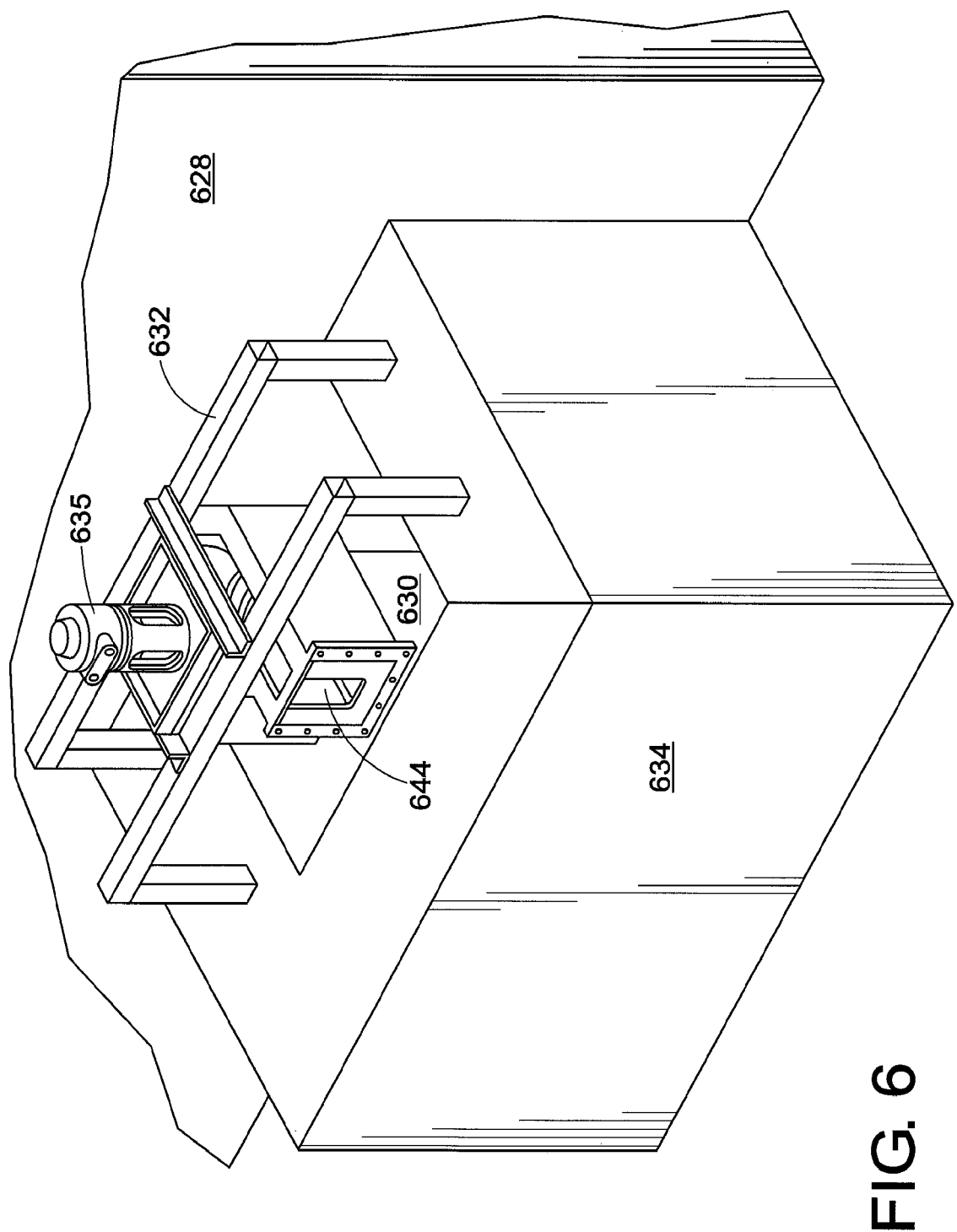
FIG. 6 is a perspective view of an alternate transfer pump in a furnace sidewell.
Figure 7:
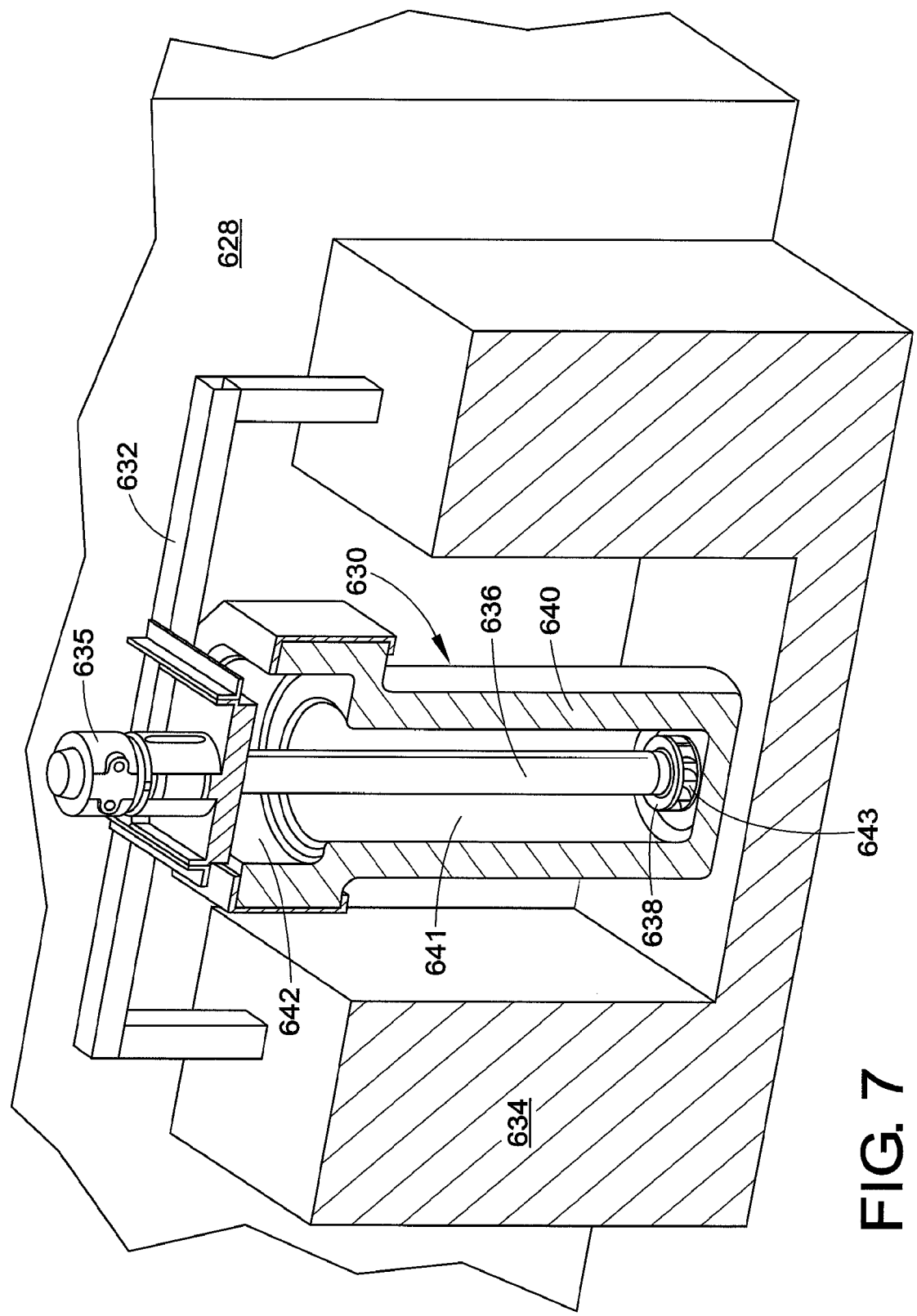
FIG. 7 is a cross-section view of the transfer pump of FIG. 6.

With reference to FIGS. 6 and 7, a molten metal overflow transfer pump 630 is depicted in association with a furnace 628. The pump assembly is more fully described in U.S. Patent Publication 2013/0101424, which is herein incorporated by reference. Pump 630 is suspended via metallic framing 632 which rests on the walls of the furnace bay 634. A motor 635 rotates a shaft 636 and the appended impeller 638. A refractory body 640 forms an elongated generally cylindrical pump chamber or tube 641. The refractory body can be formed, for example, from fused silica, silicon carbide, C/C composite material or combinations thereof. Body 640 includes an inlet 643 which receives impeller 638. Impeller 638 can be constructed wholly or partially of a C/C composite material. Preferably, bearing rings (not shown) are provided to facilitate even wear and rotation of the impeller 638 therein. The bearing rings can be composed of C/C composite material.

In operation, molten metal is drawn into the impeller through the inlet 643 and forced upwardly within tube 641 in the shape of a forced ("equilibrium") vortex. At a top of the tube 641 a volute shaped chamber 642 is provided to direct the molten metal vortex created by rotation of the impeller outwardly into trough 644. Trough 644 can be joined/mated with additional trough members or tubing to direct the molten metal to its desired location such as a casting apparatus, a ladle or other mechanism as known to those skilled in the art. The trough can be formed or coated with a C/C composite material.

Although centrifugal pumps operate satisfactorily to pump molten metal, they have never found acceptance as a means to fill molten metal molds. Rather, this task has been left to electromagnetic pumps, pressurized furnaces and ladeling. Known centrifugal pumps generally control a flow rate and pressure of molten metal by modulating the rotational rate of the impeller. However, this control mechanism experiences erratic control of the flow rate and pressure of molten metal when attempting to transfer molten metal into a mold such as a form mold. The erratic control of the flow of molten metal into the form mold is especially prevalent when attempting to fill a form mold for a complicated or intricately formed tool or part. A centrifugal pump capable of filling mold forms has been described in U.S. Published Application 2014/0044520, which is herein incorporated by reference.

Figure 8:
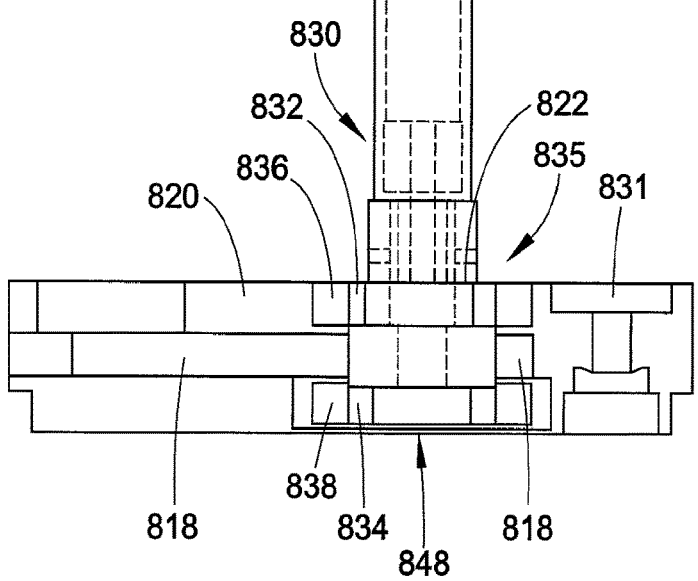
FIG. 8 is a side elevation view of a mold pump, partially in cross-section.

With reference to FIG. 8, a mold pump assembly 810 is illustrated. The assembly includes an elongated shaft 816 having a cylindrical shape having a rotational axis that is generally perpendicular to the base member 820. The elongated shaft has a first end 828 that is adapted to attach to a motor (not shown) by a coupling (not shown) and a second end 830 that is connected to an impeller 822. The impeller 822 is rotably positioned within the pump chamber 818 such that operation of the motor/coupling rotates the elongated shaft 816 which rotates the impeller 822 within the pump chamber 818.

The base member 820 defines the pump chamber 818 that receives the impeller 822. The base member 820 is configured to structurally receive one or more refractory posts (not shown) within passages 831. Each passage 831 is adapted to receive a metal rod disposed within a refractory sheath component of the refractory post to rigidly attach to a motor mount (not shown). The motor mount supports the motor above the molten metal.

The impeller 822 is configured with a first radial edge 832 that is axially spaced from a second radial edge 834. The first and second radial edges 832, 834 are located peripherally about the circumference of the impeller 822. The pump chamber 818 includes a bearing assembly 835 having a first bearing ring 836 axially spaced from a second bearing ring 838. The first and second radial edges 832 and 834 face the bearing rings 836 and 838, respectively. The radial edges can be comprised of a silicon carbide bearing ring. The remainder of the impeller body 823 can be comprised of a C/C composite material. The first radial edge 832 is facially aligned with the first bearing ring 836 and the second radial edge 834 is facially aligned with the second bearing ring 838. The bearing rings are made of a material, such as silicon carbide, having frictional bearing properties at high temperatures to prevent cyclic failure due to high frictional forces. The bearings are adapted to support the rotation of the impeller 822 within the base member such that the pump assembly 810 is at least substantially prevented from vibrating.

The use of a C/C composite body has been particularly advantageous in a mold pump assembly where precise dosing of molten metal quantities to a specified mold volume and shape is required. In this regard, the historical use of a graphite main body has been found to develop wear on the radial surface, particularly where the graphite material engages the silicon carbide bearing ring. Such wear can result unpredictable molten metal flow and pressure at a selected motor RPM over time.

The rotation of the impeller 822 draws molten metal, into the inlet 848 and into the chamber 818 such that continued rotation of the impeller 822 causes molten metal to be forced out of the pump chamber 818 to an outlet (not shown) of the base member 820 which communicates with a mold. Although the illustrated pump includes a C/C composite material as the main body of the impeller, it is contemplated that any of the elements intended to be disposed in the molten metal may be constructed from a C/C composite material, including bearing rings.

Figure 9:
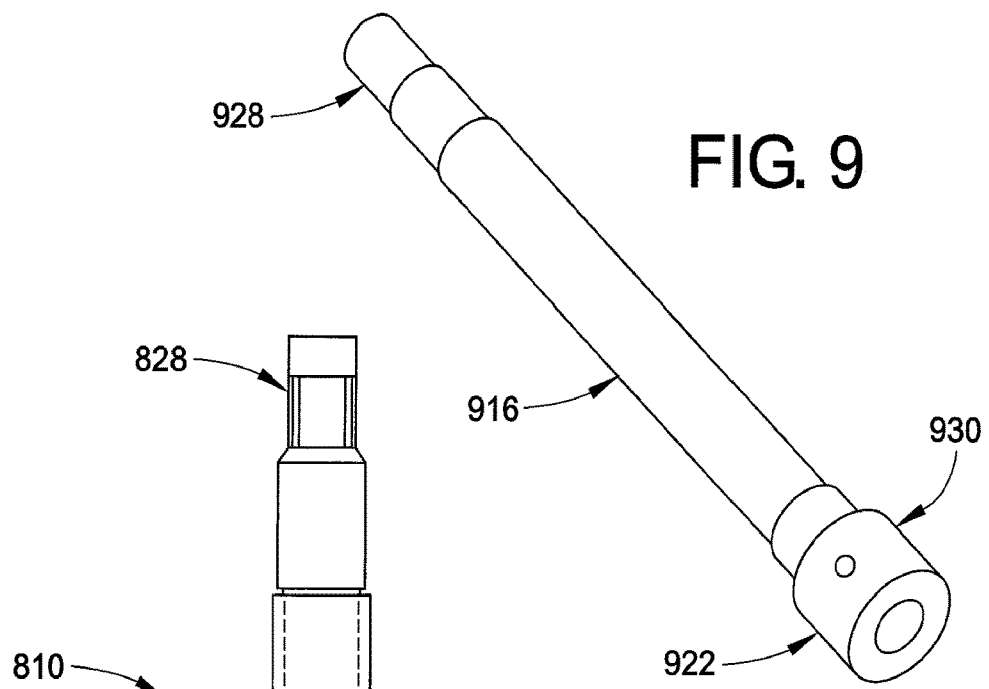
FIG. 9 is a perspective view of an alternative impeller shaft assembly suitable for use in the mold pump of FIG. 8.

For example, FIG. 9 depicts an alternative impeller shaft arrangement for a mold pump. The arrangement is comprised of a shaft 916 having a motor mount end 928 and an impeller mount end 930. The shaft can be comprised of graphite, ceramic or C/C composite material or combinations thereof. The shaft could also include a sleeve of C/C composite material. The impeller 922 can be constructed completely of a C/C composite material. In this manner, it is feasible to optionally eliminate bearing rings.

Figure 10:
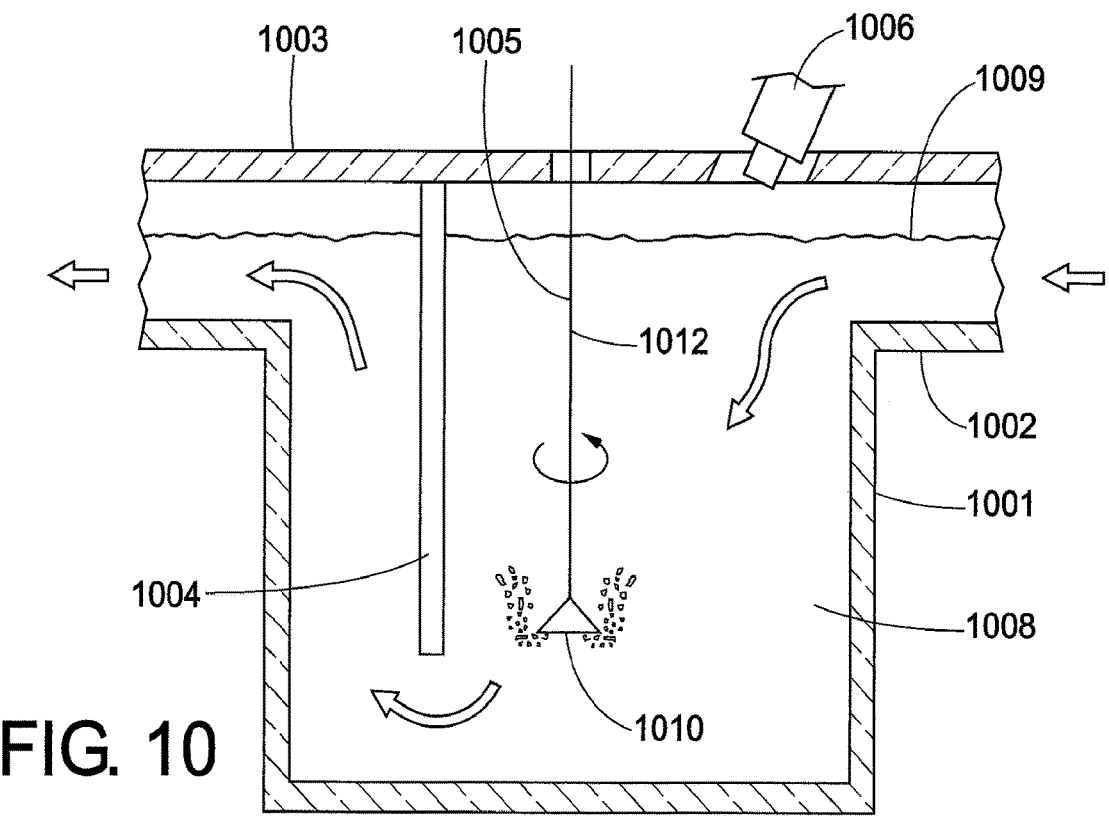
FIG. 10 is side elevation view of a degassing apparatus.

FIG. 10 schematically illustrates a conventional structure of a continuous degassing apparatus. However, the use of C/C composite elements in batch degassing is equally applicable. In order to improve the dispersion of the gas throughout the molten metal, rotating injectors are commonly used which provide shearing action of the gas bubbles and intimate stirring/mixing of the process gas with the liquid metal. The degassing apparatus receives molten metal 1009 continuously through an inlet 1002. The upper opening of a degassing container 1001 is covered by a lid 1003 and, at the downstream side, a partition 1004 extends downwardly in the direction so that it crosses the flow of the metal 1009 for preventing floating substances (suspended matter) including oxides etc., which can form dross, from being flown into the subsequent treatment process. Namely, the partition 1004 extends downwardly, so that a relatively narrowed passageway of a predetermined flow area is formed between the bottom end of the partition 1004 and the inner bottom wall of the container 1001. Such an arrangement of the partition 1004 can obtain a maximized residence time of molten metal at the treating chamber 1008 upstream from the partition 1004, so that a prolonged duration of time of a degassing operation can be achieved. A rotary gas-diffusing device 1005 is inserted through an aperture made in the lid 1003 and is located in the molten metal in the degassing container 1001. The gas-diffusing device 1005 has an impeller 1010 mounted to rotatable shaft 1012 located (immersed) in the molten metal while being subjected to a rotating movement, so that the inert gas is ejected from the lower part of the gas-diffusing device 1005, while a finely bubbled inert gas is diffused into the molten metal. A burner 1006 can be included to maintain a desired temperature. Impeller 1010 and optionally shaft 1012 can be constructed of a C/C composite material. An exemplary impeller is described in U.S. Pat. No. 8,178,036, herein incorporated by reference. Similarly, a flux injector apparatus of the type depicted in U.S. Pat. Nos. 3,767,382 and 8,025,712 can benefit from constructing various components (e.g. shaft and rotor) from a C/C composite material.

With reference to FIG. 11, an impeller 1120 constructed from C/C composite material is illustrated. The impeller is in the form of a rectangular prism having a face 1124, a face 1126, and side walls 1128, 1130, 1132, 1134. The impeller 1120 includes a gas discharge outlet 1136 opening through the face 1124. The gas discharge outlet 1136 constitutes a portion of a threaded opening 1138 that extends through the impeller 1120 and which opens through the faces 1124 and 1126. The shaft (not shown) includes a longitudinally extending bore that opens through the ends of the outlet 1136. The faces 1124, 1126 are approximately parallel with each other as are the side walls 1128, 1132 and the side walls 1130, 1134. The faces 1124, 1126 and the side walls 1128, 1130, 1132, 1134 are planar surfaces which define sharp, right-angled corners 1139. It also is possible that the impeller 1120 could be triangular, pentagonal, or otherwise polygonal in plan view.

A plurality of grooves 1152, 1154, 1156, 1158, 1160, 1162, 1164, 1166, 1168, 1170, 1172, 1174 extend radially outwardly from the hub 1150. Each groove extends from the hub to a respective side wall and the respective groove is open at the side wall.

The grooves 1152 . . . 1174 extend into the body of the impeller 1120 from the face 1124 and have a surface that is spaced from and generally parallel to the face 1126. The grooves 1152 . . . 1174 include longitudinal axes L (which is also a symmetrical axis) that are aligned with each other and that extend from one side to the opposed side The axes are colinear with the radius of the threaded opening 1138 (i.e. extend through the center of the threaded opening).

FIG. 12 illustrates an alternative impeller 1220 wherein the main body 1222 is constructed of graphite and the corners 1239 receive insert 1241 constructed of C/C composite material. Moreover, the corners may constitute high wear surfaces which can benefit by longer lived C/C composite yet total unit cost is held relatively low by inclusion of a relatively lower cost graphite main body.

The C/C composite parts can be secured to the graphite, ceramic or other C/C composite elements of the molten metal processing equipment by mechanical means, adhesive means (cement for example), or by means of a reactive-bonding joint interlayer. The interlayer can be formed of fine particles of carbide-forming metallic ingredients and carbon. The metals included in the compounds may be selected from the group consisting of W, Ti, Si, Ta, Nb, Zr, Hf, V, Cr, and Mo. Tungsten is the preferred metallic ingredient in the joint compound. The reactive-bonding layer may also contain one or more refractory compounds as a filler material. Representative refractory compounds include $TiB_2$, BN, $B_4C$, SiC, TiC, $MoSi_2$, $WSi_2$. A bonding layer can comprise a slurry made from, for example, 10 grams of tungsten powder and 0.5 grams of carbon powder and 12 milliliters of methanol. The parts to be joined with the bonding layer are heated in an argon atmosphere and under a compressive pressure of 5 megapascals to a temperature of 1450-1580° C. for a period of from 10-30 minutes. The method includes the steps of: providing a first C/C composite piece and a second piece, wherein the second piece has a surface that is complementary to a surface of the C/C composite piece; providing a layer of a mixture of metal powder and carbon powder on the first complementary mating surface; arranging the second C/C composite piece on the powder layer such that the second complimentary mating surface is matched to the first complementary mating surface, thereby forming a construct of the first C/C composite piece, the powder layer, and the second piece; placing the construct into a press and applying pressure to the construct to press together the two pieces joined at their complementary surfaces; and applying an electrical current to the powder in the construct to initiate an oxidation-reduction reaction, thereby bonding the pieces together.

Figure 13:
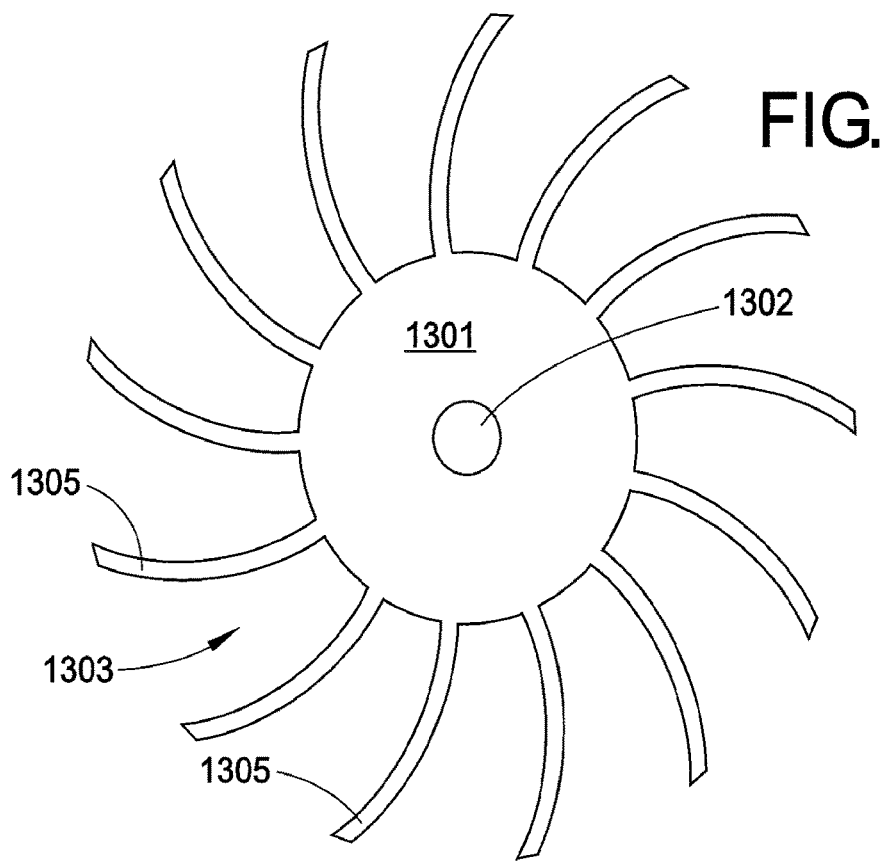
FIG. 13 is a top plan view of an alternative impeller configuration achievable using a C/C composite material.

With reference to FIG. 13, it is noted that the traditional shapes of molten metal impellers (including pump impellers, scrap submergence impellers and degassing impellers) have been constrained by the strength of graphite and/or the machineability of ceramic. Accordingly, by employing C/C composite in the manufacture of the impeller, it is envisioned that increased efficiency designs are achievable. For example, the configuration of FIG. 13 constructed entirely of C/C composite material is machineable and can possess sufficient strength to operate in a molten metal environment. Advantageously, the design provides a central hub 1301 defining bore 1302 and surrounded by relatively large fluid receiving slots 1303 defined by thin vanes 1305. Vanes 1305 can be forward or rearwardly curved as desired to increase flow rate or pressure.

Figure 14:
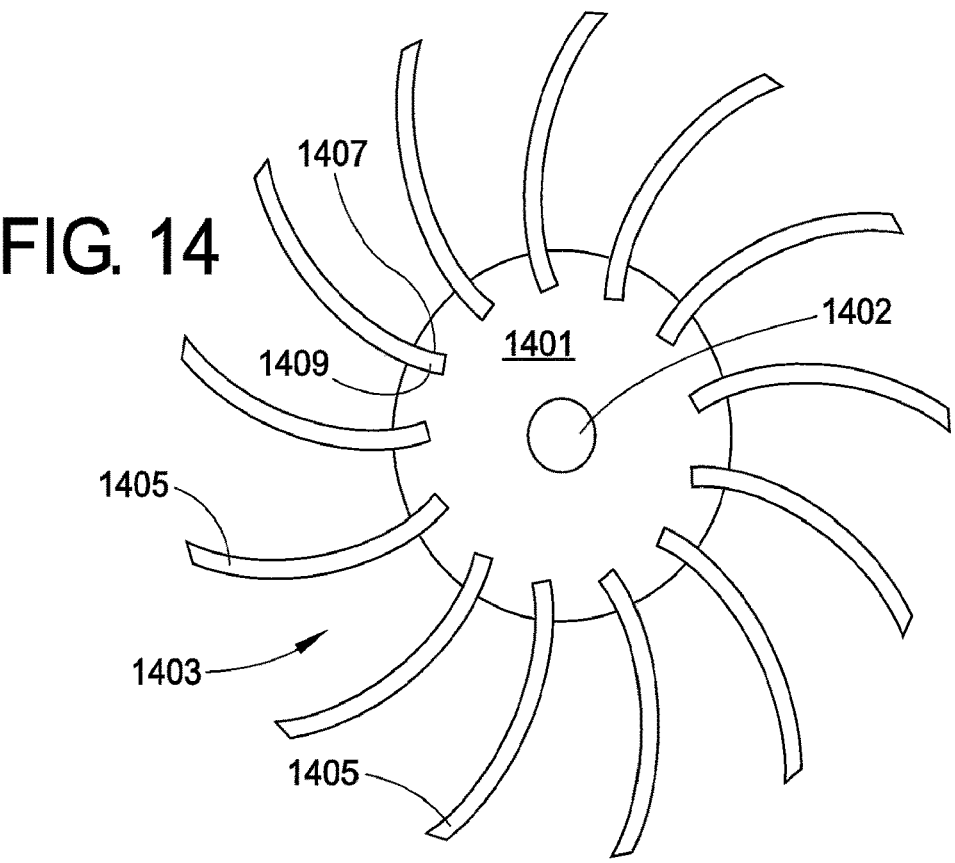
FIG. 14 is a hybrid impeller of a similar style to FIG. 13 having a graphite main body and C/C composite vanes.

Turning now to FIG. 14, the use of C/C composite material in combination with graphite is demonstrated. Particularly, a graphite hub 1401 defining a shaft receiving bore 1402 is provided. A plurality of C/C composite vanes 1405 extend from hub 1401 and define fluid receiving slots 1403. Hub 1401 further includes a plurality of cut-outs 1407 configured to receive an end 1409 of each vane 1405. The vane ends 1409 can be cemented or powder bonded to the graphite hub 1401 within each cut out 1407.

Molten metal scrap, particularly aluminum, can be difficult to submerge based on a variety of characteristics such as the size of the scrap particles and the presence of oil or other organic material on its surface. More specifically, piece size and organic content can strongly influence the buoyancy of the material and adversely affect the ability of the scrap submergence system to submerge the scrap. In this regard, scrap which is not submerged and floats on the top will typically not melt, and may in fact burn. Accordingly, rapid submergence of scrap particles is an essential characteristic of any system.

A variety of apparatus have been used in the melting bay (specifically in the charge well) to facilitate the submergence of the scrap metal below the surface of the molten metal bath. One system is a mechanical system constructed primarily of a rotor which creates a molten metal flow from the top surface. Examples of these devices are shown in U.S. Pat. Nos. 3,873,305; 3,997,336; 4,128,415; 4,930,986; and 5,310,412, the disclosure of which are herein incorporated by reference. The various components of these apparatus may benefit from construction from C/C composite material.

Figure 15:
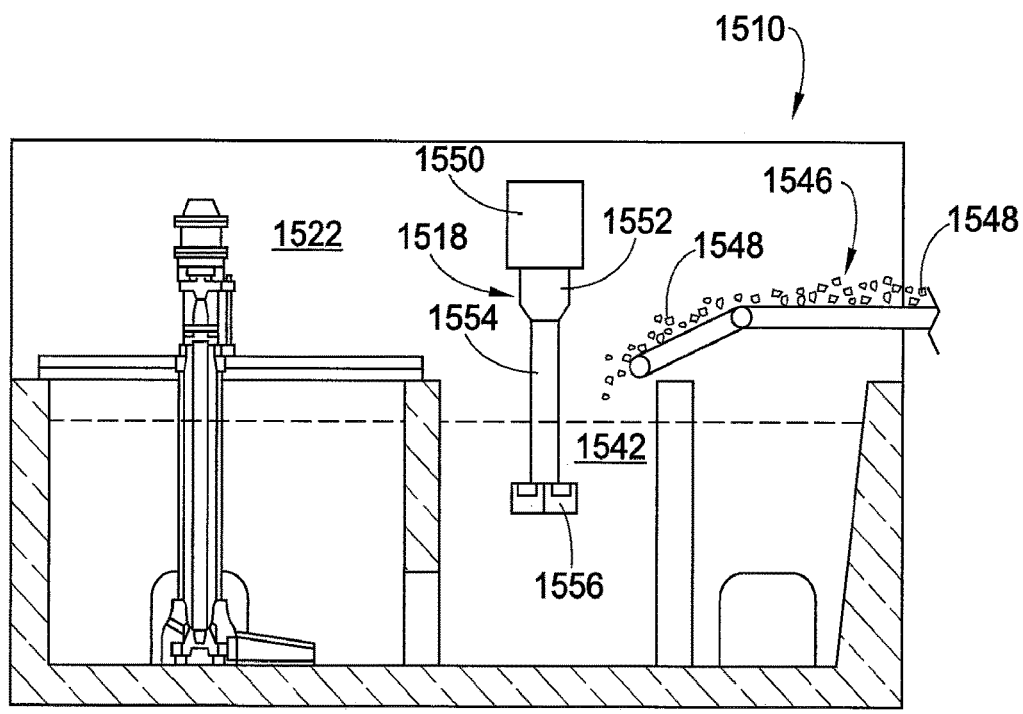
FIG. 15 is a cross-sectional view of a scrap meting apparatus.

Referring to FIG. 15, a conveyor 1546 is disposed adjacent the charge well 1518, forwardly of the front wall 1522. Particles 1548 of scrap metal are conveyed by the conveyor 1546 for discharge into the charge well 1518. A mixing apparatus 1510 includes a drive motor and support 1550. The drive motor and support 1550 are disposed above the charge well 1518. A coupling 1552 projects from the underside of the drive motor and support 1550. A vertically oriented, elongate shaft 1554 projects downwardly from the underside of the coupling 1552. An impeller 1556 is rigidly secured to the shaft 1554 at a location remote from the coupling 1552. Impeller 1556 is disposed within the molten metal 1542. The impeller 1556 or portions thereof and optionally the shaft 1554 or portions thereof can be made of C/C composite material.

As the invention has been described, it will be apparent to those skilled in the art that the same may be varied in many ways without departing from the intended spirit and scope of the invention, and any and all such modifications are intended to be included within the scope of the appended claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A molten metal processing apparatus selected from a mechanical pump, a degasser, a flux injector and a scrap submergence device including at least one element selected from a shaft, impeller, bearing ring, post, post sleeve, gas injection tube, tube plug, and riser tube in the case of a mechanical pump or selected from a shaft and impeller in the case of a degasser, flux injector or scrap submergence device, wherein the element consists of (i) a C/C composite, said C/C composite consisting of carbon fibers disposed in a carbon matrix and an oxidation resistant impregnate or (ii) graphite and the C/C composite, and wherein said element is not coated.

2. The apparatus of claim 1, wherein said element comprises an impeller.

3. The apparatus of claim 1, wherein said element comprises a bearing ring.

4. The apparatus of claim 1, wherein said carbon matrix is derived from a phenolic resin or pitch.

5. The apparatus of claim 1 wherein said carbon fibers are in the form of a yarn or a cloth.

6. An apparatus selected from a molten metal pump, degasser, flux injector, and/or scrap submergence device comprising a motor, a shaft engaging the motor at a first end and an impeller at a second end, wherein the impeller consists of (i) a C/C composite consisting of carbon fibers disposed in a carbon matrix and an oxidation resistant impregnate or (ii) graphite and the C/C composite.

7. The apparatus of claim 6, wherein said shaft consists of C/C composite.

8. The apparatus of claim 6, wherein said impeller consists of C/C composite.

9. The apparatus of claim 6, wherein said bearing ring is included and the bearing ring consists of C/C composite.

10. An impeller for a molten metal precessing apparatus, said impeller including a hub configured to receive a shaft, said hub comprised of graphite and at least one vane extending from the hub, said vane consisting of C/C composite, said C/C composite consisting of carbon fibers disposed in a carbon matrix and an oxidation resistant impregnate.

11. The apparatus of claim 1, wherein said oxidation resistant impregnate comprises a phosphate.

12. The apparatus of claim 6, wherein said oxidation resistant impregnate comprises a phosphate.

13. The apparatus of claim 10, wherein said oxidation resistant impregnate comprises a phosphate.

* * * * *